(12) United States Patent
Chu et al.

(10) Patent No.: US 7,611,969 B2
(45) Date of Patent: Nov. 3, 2009

(54) GENERATION AND APPLICATIONS OF NEGATIVE DIELECTRIC CONSTANT MATERIALS

(75) Inventors: Ching-Wu Chu, Houston, TX (US); Feng Chen, Houston, TX (US); Yu-Yi Xue, Houston, TX (US); Jason Shulman, Houston, TX (US); Stephen Tsui, Houston, TX (US)

(73) Assignee: University of Houston, Houston, TX (US)

( * ) Notice: Subject to any disclaimer, the term of this patent is extended or adjusted under 35 U.S.C. 154(b) by 0 days.

(21) Appl. No.: 11/356,767

(22) Filed: Feb. 17, 2006

(65) Prior Publication Data

US 2007/0109460 A1 May 17, 2007

Related U.S. Application Data

(60) Provisional application No. 60/653,805, filed on Feb. 17, 2005.

(51) Int. Cl.
*H01L 21/326* (2006.01)
*H01L 21/00* (2006.01)

(52) U.S. Cl. .............................. 438/466; 438/22; 438/24

(58) Field of Classification Search .................. 438/3, 438/20, 22, 24, 900, 466; 257/E21.327
See application file for complete search history.

(56) References Cited

U.S. PATENT DOCUMENTS

2003/0157272 A1 * 8/2003 Tonai et al. .................. 427/600

FOREIGN PATENT DOCUMENTS

WO   WO 03/075291   * 9/2003

OTHER PUBLICATIONS

Klimov et al., The Use of the Relativistic Effect for Obtaining Negative Permittivity, International Conference on Antenna Theory and Techniques, Sept. 9-12, 2003, Sevastopol, Ukraine, pp. 171-172.*

* cited by examiner

*Primary Examiner*—Hung Vu
(74) *Attorney, Agent, or Firm*—Akin Gump Strauss Hauer & Feld, LLP

(57) ABSTRACT

A negative dielectric is induced by the application of a dc bias-electric field in aggregates of oxide nano-particles whose surfaces have been specially treated. The magnitude of the dielectric constant and the frequency where the negative dielectric constant occurs can be adjusted. Such material systems have profound implications in novel devices as well as in science development, e.g. unusual wave propagation, secured communication and ultra-high temperature superconductivity.

1 Claim, 5 Drawing Sheets

US 7,611,969 B2

GENERATION AND APPLICATIONS OF NEGATIVE DIELECTRIC CONSTANT MATERIALS

CROSS-REFERENCE TO RELATED APPLICATIONS

This application claims the benefit under 35 U.S.C. § 119 (e) of U.S. Provisional Patent Application No. 60/653,805, filed on Feb. 17, 2005, which is incorporated by reference in its entirety herein for all purposes.

STATEMENTS REGARDING FEDERALLY SPONSORED RESEARCH OR DEVELOPMENT

The U.S. Government has a paid-up license in this invention, and the right in limited circumstances to require the patent owner to license others on reasonable terms as provided for by the terms of the U.S. Air Force Contract No. F49620-93-1-0310 and the National Science Foundation (NSF) Grant No. 9804325.

BACKGROUND OF THE INVENTION

1. Field of the Invention

The present invention relates to the field of induction of a negative dielectric constant into a material.

2. Description of the Related Art

The negative static dielectric constant $\in'(k,\omega=0)$, which presents a net attractive force between two similar charges, has been theoretically claimed to be "more the rule than an exception" after intense debates about causality, instability and the maximum $T_c$ of superconductors. Despite such predictions, however, negative $\in'(k,\omega=0)$ has never been observed in bulk materials. Metals and their associated plasmas have been suggested to be the best candidate. However, their dielectric admittance $\omega\in'\approx\sigma\omega/\gamma$ is immeasurably smaller than the accompanied conductivity a even at radio-frequencies with the typical plasma damping-rate $\gamma$ (at the order of the carrier collision rate) around $10^{10}$-$10^{13}$/sec.

BRIEF SUMMARY OF THE INVENTION

A negative dielectric is induced in a material by the application of temperature, moisture, and/or a dc bias-electric field in certain materials (such as aggregates of oxide nano-particles) whose surfaces have been specially treated. The magnitude of the dielectric constant and the frequency where the negative dielectric constant occurs can be adjusted. Such material systems have profound implications in novel devices as well as in science development, e.g. unusual wave propagation, secured communication and ultra-high temperature superconductivity.

BRIEF DESCRIPTION OF THE SEVERAL VIEWS OF THE DRAWINGS

A better understanding of the present invention can be obtained when the following detailed description of various disclosed embodiments is considered in conjunction with the following drawings, in which.

DETAILED DESCRIPTION OF THE INVENTION

The invention solves the problem identified above through special treatment of the particle surface and introduces dc bias into nano-particle aggregates. The $\in'$ of the giant electrorheological (ER) fluid at 1 mHz, for example, switches from $+10^3$ to $-10^5$ under dc bias. This system can be characterized with extremely low damping rates, which leads to an observable negative static dielectric constant. This will further affect the interaction forces and the movements of charged components in the media. This field-driven sign switch and the negative $\in'(k,\omega=0)$ hold great potential for applications.

Figures 1A, 1B:
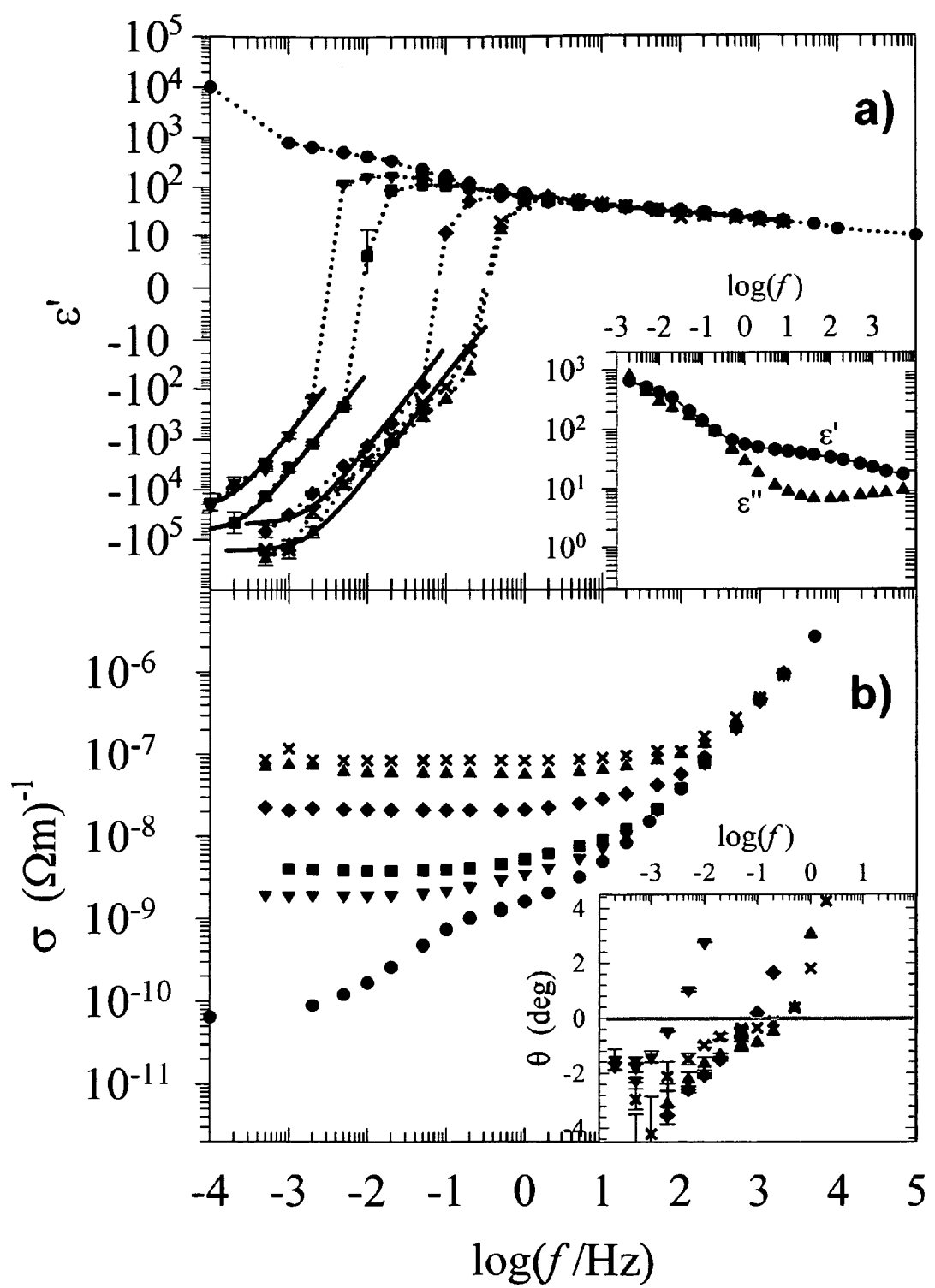
FIG. 1A illustrates the ω-dependency of the dielectric constant $\in'$ and the inset illustrates the real (●) and the imaginary (▼) parts of the complex permittivity $\in(\omega)$ where E=0 ( ); 0.5 (O); 1 (Δ); 2 (◇); 3.5 (∇) and 5 (O) kV/mm, respectively.
FIG. 1B shows the conductivity and the inset shows the phase angles of the measured permittivity.

FIG. 1A shows ω-dependency of the dielectric constant $\in'$, the ticks are marked according to the scale of $\text{sign}(\in')\log_{10}(1+|\in'|)$. The thick lines at low-ω part fits the $\omega/(\gamma^2+\omega^2)$ of free plasma (see text). The symbols without visible error bars have errors much smaller than the size of the error bar. Inset. The real (●) and the imaginary (▼) parts of the complex permittivity $\in(\omega)$. E=0 ( ); 0.5 (O); 1 (Δ); 2 (◇); 3.5 (∇) and 5 (O) kV/mm, respectively.

FIG. 1B shows the conductivity σ. The inset shows the phase angles of the measured permittivity. The thick gray line represents the data spread of resistors with resistances values from 10 MΩ to 2 GΩ, corresponding to the whole resistance range of the cell under the fields used). The error bars represent the statistical data spread during repeated measurements. The same symbols are used in FIG. 1a.

Figure 2:
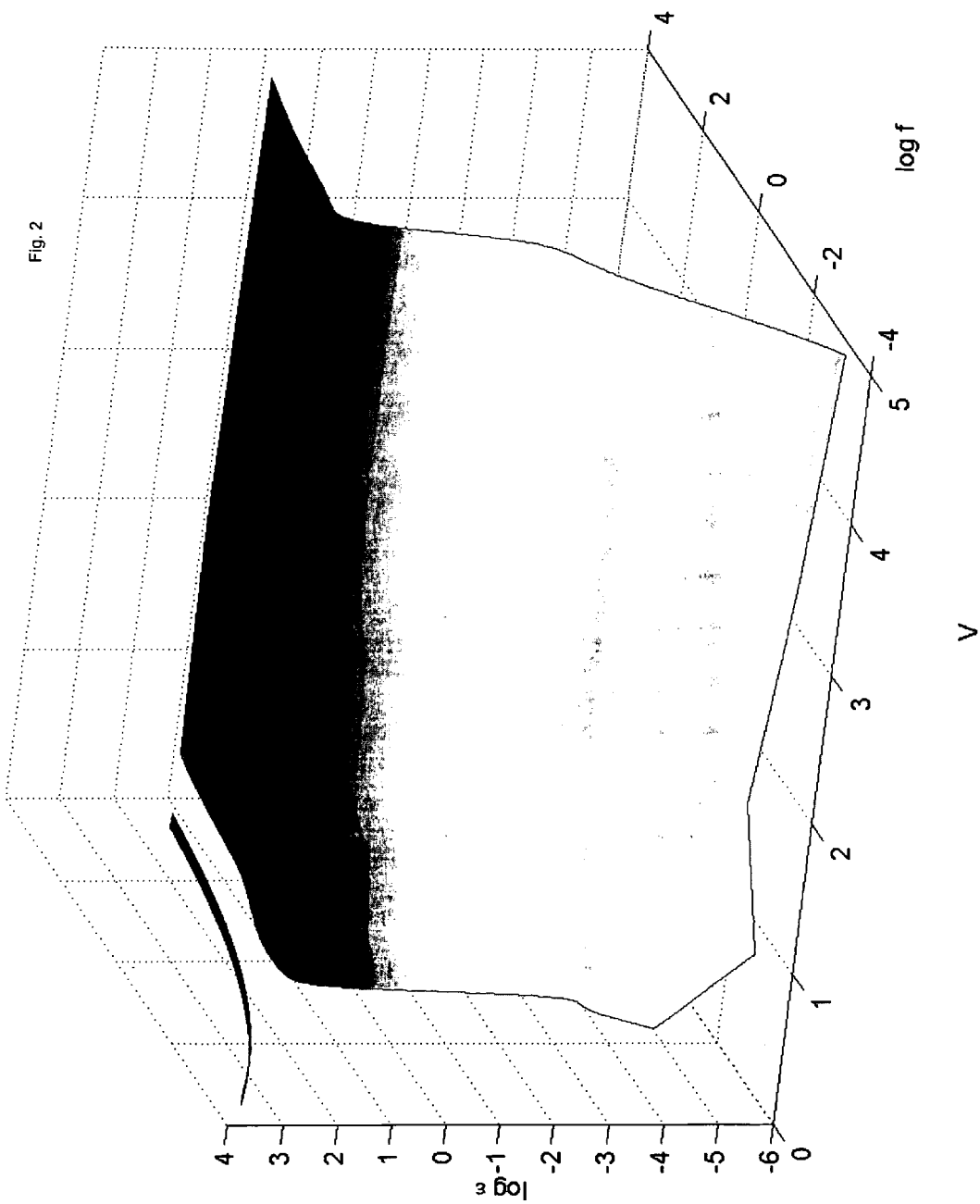
FIG. 2 illustrates $\in'(V_{dc},\omega)$.

FIG. 2 illustrates $\in'(V_{dc},\omega)$.

A negative static γ', a topic at the core of several debates (e.g. the upper bound of the superconducting transition temperature), is observed in urea-coated nanoparticle assemblies. This reactive response is highly linear, involves significant energy storage-conversion, and follows a plasma-like dispersion. It is suggested that the phenomenon is associated with the conductivity of the nanoparticle surfaces, and represents a new collective excitation. Significant implications for fields ranging from left-handed materials to 2D quantum gases are expected.

The admissibility of a negative static dielectric constant, $\in'(k,\omega=0)$, where ω and k are frequency and wave-vector, has been hotly debated for decades. It has since been shown that a negative $\epsilon'(k,\omega=0)$ is permissible even in the long wavelength limit of $k\to 0$ without violating the requirements of causality or stability. A negative $\epsilon'(k,\omega=0)$ has significant implications for many fields. It has been shown, for example, that the $T_c$-limit of phonon mediated superconductivity, which is below 20-30 K for a positive $\epsilon'(k,\omega=0)$ [2], can be lifted if $\epsilon'(k,\omega=0)$ is negative. However, until recently, a negative $\epsilon'$ has only been detected at frequencies at or above the optical region. Artificial structures have been consequentially designed to change the situation, which lead to the rapid development of left-handed materials. The negative $\epsilon'$, however, is still restricted to the microwave band or above, and the debate about whether new physics may be invoked to realize a plasma-like $\epsilon'<0$ remains unsettled. It should be noted that negative capacitances have been reported in both 2D carriers, which exhibit negative compressibility, and disordered systems. Such a negative sign, however, is not directly observable in the former case and, in the latter cases, has been largely attributed to electrochemical reactions, which are not conventionally regarded as a dielectric response. It is also interesting to note that passive current retardations (such as carrier trapping), another proposed interpretation, actually cannot lead to a negative static $\epsilon'$.

The existence of a negative static dielectric constant in a nano-colloid is described below. The $\epsilon'$ changes sign with electric field, and is associated with a genuine dielectric response as evidenced by a linear, polarity-independent, and electrode material-independent non-chemical process with significant energy storage-conversion. The negative $\epsilon'(\omega)$ is described by a plasma-like $\epsilon'=1-\omega_p^2/(\omega^2+\gamma^2)$ with a plasma frequency $\omega_p$ and a very small damping factor $\gamma \sim 10^{-3} \text{sec}^{-1}$. This unusually small $\gamma$ suggests that collective modes are responsible for the phenomenon. The observations may have profound impacts on various fields such as 2D quantum gases, left-handed materials, and possibly the study of phonon mediated high temperature superconductivity.

Figures 3A, 3B:
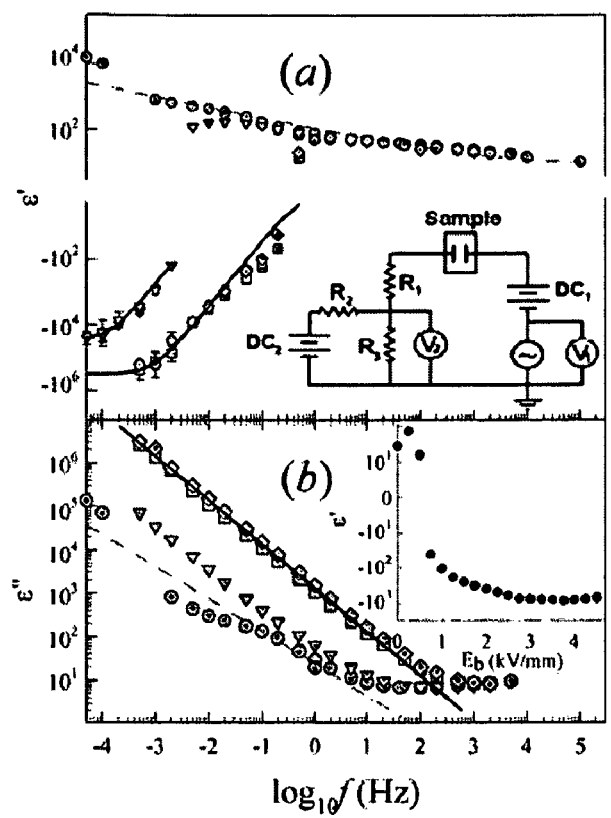
FIG. 3A illustrates $\in'(\omega)$ at $V_{ac}$=0.03 kV/mm peak-to-peak, where the symbols are as follows: $E_b$=●: 0; ▼: 0.5; ■: 3.5 and ◆: 5 kV/mm. The thick solid lines are plasma fits, and the thin dashed line is the fractional power law fit. An inset illustrates a circuit.
FIG. 3B illustrates $\in''(\omega)$. The thick solid line corresponds to a constant σ, and the dashed line the power law fit. An inset illustrates the $\in'$ at 20 mHz.

The nano-colloid is a giant electrorheological (ER) fluid consisting of 20 nm urea-coated $Ba_{0.8}Rb_{0.4}TiO(C_2O_4)_2$ (BRTCO) nanoparticles suspended in silicone oil. The nanoparticle to oil ratio is 10 g: 3 ml. Details of the ER fluid preparation and its general properties have been published. Capacitor cells were constructed of two parallel copper electrodes with dimensions of 6 mm×13 mm at a distance around 0.1 mm. The apparent wave-vector of $|k|$, therefore, is around $10^0$-$10^2$ $cm^{-1}$ if the fluid is treated as a homogeneous medium, but might be as large as $10^5$ $cm^{-1}$ when the nanostructures are considered. The schematic setup, which includes only dc couplings to avoid unwanted phase-shifts, is shown in the Inset of FIG. 3A. The phase angle of the technique is calibrated against known resistors and capacitors. Both the systematic deviation and the resolution of the phase-angle are within 0.05°. Additional measurements on silicone oil and air further confirm our accuracy. We determine the effective permittivity of the nanocomposite material as $\epsilon=\epsilon'-i\epsilon''=\epsilon'-i\sigma/\omega\epsilon_0$, with a superimposed dc bias $E_b$, as $-id \cdot I_{ac}/(\epsilon_0 \omega V_{ac} S)$, where $\sigma$, $I_{ac}$, $\epsilon_0$, d, $V_{ac}$ and S are the conductivity, the ac current, the vacuum permittivity, the gap between electrodes, the ac voltage and the electrode area, respectively.

The $\epsilon'(\omega)$ and $\epsilon''(\omega)$ of the ER fluid with Cu electrodes at several $E_b$ are shown in FIGS. 3A-B, respectively. The corresponding phase-angles are typically 4° or higher, which is far larger than both the instrument resolution and the data spread (shown as error bars). Both $\epsilon'$ and $\epsilon''$ at $E_b=0$ increase with the decrease of $\omega$ (FIGS. 3A-B). Similar non-Debye dispersions have been described as the universal dielectric response (UDR) of disordered systems: $\epsilon(\omega)'-\epsilon'(\infty) \propto [\sigma(\omega)-\sigma(0)]/\omega \propto \omega^{-m}$ with $0<m<1$, though noticeable deviations exist.

Figure 4:
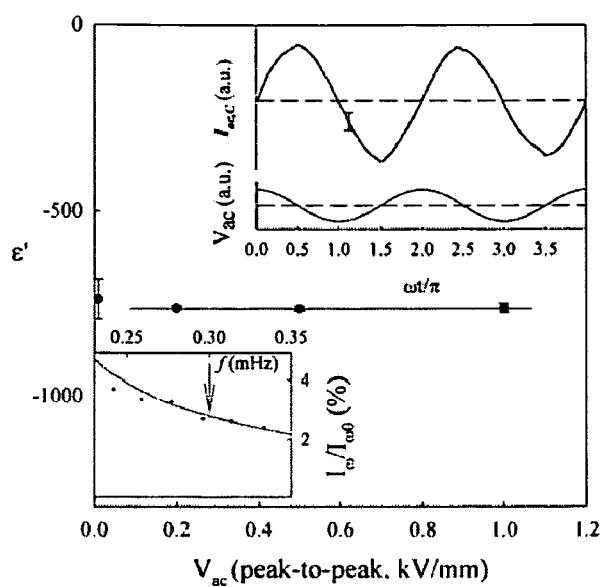
FIG. 4 illustrates $\in'$ VS. $V_{ac}$ at 10 mHz with $E_b$=3.5 kV/mm. The upper-right inset illustrates the ac excitation voltage (bottom) and the off-phase current (top). The dashed line represents the dc baseline. The bottom-left inset illustrates the Fourier spectrum $I_\omega$, which is normalized by the current $I_{\omega 0}$ at the fundamental frequency $\omega_0$=0.1 mHz, around $3\omega_0$ (arrow). The absence of a $3^{rd}$ harmonic is apparent. Circles: the deduced data; line: $1/f^m$ fit is a chart of the dielectric constant with two inserts (upper-right: ac excitation voltage and current and bottom left: Fourier spectrum.

A negative $\epsilon$ is induced by an $E_b \geq 0.2$ kV/mm below a threshold frequency (FIG. 4A). At 20 mHz, for example, the $\epsilon'$ becomes negative with $E_b$ and finally saturates above 2.5 kV/mm (Inset, FIG. 3B). The observed negative $\epsilon'$ down to 50 μHz, the lowest frequency explored, fits well with the free plasma model of $\epsilon'=1-\omega_p^2/(\omega^2+\gamma^2)$ over three orders of magnitude (FIG. 3A). It should be pointed out that a negative $\epsilon'(\omega=0)$ needs to be associated with such a plasma-like dispersion simply due to the analyticity of $1/(\epsilon'-i\epsilon'')$. We, therefore, refer to the underlying mechanism as a pseudo-plasma, although it may microscopically differ from a classical plasma.

In addition to inductors, plasmas and quantum capacitance, previously proposed models, to the best of our knowledge, can be categorized into two classes: i) electrochemical reactions, and ii) passive current retardation due to unusual trapping, junctions or space-charge limited current (SCLC). For the present case, an inductive origin can be ruled out based on our magnetic measurements. The observed $\epsilon'$ is symmetric against the $E_b$ polarity, which is different from most of the previous reports. Cells with electrodes made of different materials, i.e. Cu, Ni, Pt and Au, show the same field-induced sign-change of $\epsilon'$. Preliminary results on other chemically different materials, such as $Al_2O_3$ powder, have also shown negative plasma-like $\epsilon'$. All of these findings are in disagreement with models based on chemical reactions, junctions and SCLC.

Furthermore, an electrochemical origin, as well as those associated with junctions and SCLC, can be identified through their inherent non-linearity. For example, competing charge-transfers at the electrode, which are used to explain apparent negative capacitances, are governed by the Butler-Volmer equation of $I \propto \exp[-\alpha(V-V_{eq})/k_BT]-\exp[(1-\alpha)\cdot(V-V_{eq})/k_BT]$, where $\alpha$, $k_B$ and $V_{eq}$ are transfer coefficient, the Boltzmann constant and the equilibrium potential, respectively. The I-V character, therefore, should be highly non-linear with $k_BT \leq 0.1$ eV. This conjecture is supported by the fact that all "negative capacitances" observed both during electrochemical reactions and across junctions appear only in a very narrow dc bias range (typically narrower than 1 V) and change significantly within this limited range.

Extensive measurements, therefore, were carried out to evaluate the linearity through the waveform of the off-phase current, the third harmonic, the $V_{ac}$-dependence and the $E_b$-dependence of the $\epsilon'$. A cosine-wave voltage with 1 kV/mm peak-to-peak amplitude was first applied at $10^{-4}$ Hz and $E_b=3.5$ kV/mm. The resulting in-phase part $I_{ac,R}$, which is approximated as the average between the voltage increase and decrease branches, is subtracted from $I_{ac}$. The off-phase $I_{ac,C}$ shows a good sine-wave form (the right-upper inset, FIG. 4). The slight distortions are well within the experimental resolution (shown as an error-bar). This suggests that the linearity is maintained even at 1 kV/mm peak-to-peak. Higher harmonics and noise were also extracted from $I_{ac}$, which is dominated by $I_{ac,R}$, through the fast Fourier transformation (FFT). The third harmonic, which is the lowest-order distortion associated with the non-linearity, is below 1% over the $1/f$ noise floor (the left-bottom inset, FIG. 4). The linearity of $I_{ac,C}$ (or $\epsilon'$) is expected to be even better based on its weaker $E_b$-dependence (not shown here). Finally, the $V_{ac}$-dependence of $\epsilon$ was measured directly. The $\epsilon'$ at 10 mHz and $E_b=3.5$ kV/mm, for example, is found to be independent of $V_{ac}/d$ up to 1 kV/mm within the data spread of 0.5% (FIG. 2). Combined with the $\partial(\ln\epsilon')/\partial E_b \approx 0.02 \pm 0.04$ per kV/mm observed above 2.5 kV/mm (Inset, FIG. 3B), this data shows that the linearity of $\in'$ is excellent. We therefore rule out an electrochemical origin. In fact, a linear system can always be described by a linear differential equation. While an Ohmic conductor obeys a first-order equation, the above linear plasma-like dispersion is simply the solution of a second-order differential equation, i.e. a pseudo-plasma.

Figure 5:
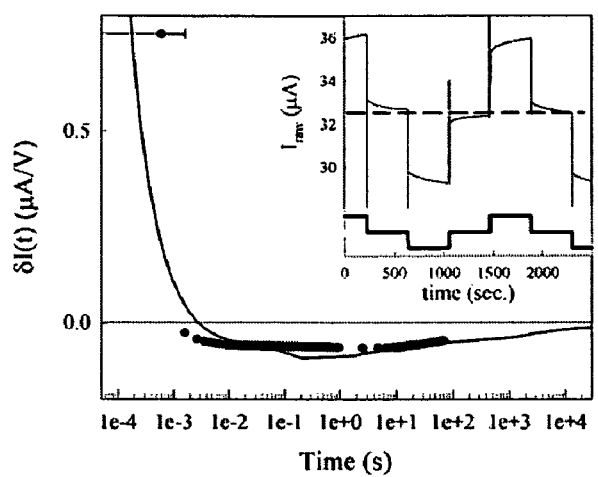
FIG. 5 illustrates the measured δI(t) at $E_b$=2 kV/mm, where the symbols are as follows: data; solid line: FFT based on the measured $\in'$ and σ–σ(ω=0). The inset illustrates the raw current (top solid thin line) with periodic series of 210 V-200 V-190 V multi-step inputs (bottom thick line). The dashed line represents an average of the tail currents, and serves as the baseline in the main figure.

Lagging transient currents $\delta I$ after a step increase from V to V+$\Delta$V at t=0, e.g. through an unusual trapping (where the trapped carriers "remember" the initial time/phase), have been commonly used to interpret negative capacitances. It should be pointed out, however, that a fundamental difference exists between such passive retardation and the negative static $\in'$: all passive currents should be along the E direction while those associated with a plasma-like $\in'-i\in''$, i.e. negative $\in'(k,0)$, flow against E at $t \geq 1/\omega_p$. To test the nature of the $\in'(k,0)$, the transient current was studied by applying alternating voltage steps of $\Delta V = \pm 10$ V were superimposed on a constant voltage of 190 V across the 0.1 mm cell (bottom thick line in the inset of FIG. 5). The tails of the V-increase and the V-decrease branches approach the same baseline, $I(\infty)$ (dashed line, Inset, FIG. 5). The normalized transient current $\delta I(t)/\Delta V$ was then deduced as $[I(t)-I(\infty)]/\Delta V$, which is warranted by the linearity described above. The $\delta I/\Delta V$ is indeed found to be negative after 1 ms, i.e. it flows against the field (FIG. 5). This feature is reproducible and polarity-independent, although the timing uncertainty makes the fluctuation rather large for $t \ll 10^{-3}$ sec. To further verify, inverse FFT was used to calculate $\delta I(t)$ based on the measured dielectric response, $\in'-i(\sigma-\sigma_0)/\omega\in_0$, with the dc background, $\sigma_0$, extrapolated from the free plasma equation. It should be pointed out that a positive $\in'(k,\omega)$ below 50 $\mu$Hz should cause a shift of the baseline due to the analyticity of $\in'-i\sigma/\omega\in_0$ and lead to poorer fitting. This seems to be supported by a previous measurement, in which, unlike the present case, the transient current (de-trapped carriers) flowed along E even when the corresponding $\in'(\omega \approx 1/t)$ was negative. The good agreement between the calculation (solid line in FIG. 5) and the measured $\delta I(t)$, therefore, verifies the negative static $\in'$ of the ER fluid. It should also be pointed out that both the accumulated charge $\Delta Q \approx -4 \cdot 10^{-5}$ C and the energy-output density $\approx 10^{-2}$ J/cm$^3$ after a 10 V jump are very large. This is categorically different from any passive retardation.

The apparent stability of the colloid, as suggested by the smooth $1/f^n$-like noise (bottom inset, FIG. 4) is puzzling. Although a full understanding can only be reached when the detailed mechanism is established, we offer the following observations. First, several cold-pressed pellets of the urea/BRTCO nanoparticles were tested in air. Their $\in'$ is similar to those of the above ER cells, which demonstrates that particle movements are largely decoupled from the plasma-like $\in'$. Secondly, the electronic instability, either dynamic or static (e.g. as phase-separation) should be suppressed by the electrostatic energy cost. This is similar to the case of 2D carriers with negative compressibility. In addition, the in-phase current ($\propto \omega\in''$) acts like a damping resistor. Its dominance, therefore, should greatly suppress the possible dynamic fluctuations. Static instability, especially meso-scale phase-separations, however, may well occur. The above data (as well as those of the 2D carriers), fortunately, suggest that such a phase-separation may coexist with a negative static $\in'$ under certain conditions.

The analyticity of $\in'-i\sigma/\omega\in_0$ suggests that a significant conductance should appear if $\in'(k,0)<0$. Both urea and silicone oil, however, are insulators in their bulk forms although all nanoassemblies tested with negative $\in'(k,0)$ do show significant leakage. Cold-pressed pellets were, therefore, tested under different humidities to verify the roles of the different components. A field-induced negative $\in'$ with cop up to 1 Hz was observed together with a significant conductivity under a relative humidity of 50-70%. However, the same pellet in dry air possesses a resistance seventy-fold higher and a positive-only $\in'$. This shows that the nanoparticle surfaces are the primary conducting paths, which may be modeled as field-induced quasi-2D carriers. Our systematic measurements under different temperatures, humidities and particle sizes further reveal a close correlation between the cop and the dc conductivity. We therefore suggest 2D carriers may play key roles here. While the underlying mechanism is not clear at this stage, it is interesting to note that the emittance of a nano-contact, $CR-DT^2/4$ in Landauer-Büttiker formulation, can be negative, where C, D, R, T are the effective capacitance, density of states, deflection and transmission probabilities, respectively. Nanostructures with proper contacts and surface states, therefore, may offer a new way to achieve plasma-like dielectric responses.

In summary, a negative static $\in'$ is observed in nanoparticle assemblies. The negative $\in'$ follows the dispersion of plasma. This bulk dielectric response is highly linear and associated with significant energy storage-conversion. Additionally, the data show that the negative $\in'(0)$ is closely related to the interfacial conductivity. Further understanding of the mechanism may open routes for new physics and potential applications, with particular regards to the fields of left-handed materials, 2D quantum gases, and dielectric responses of nano structures.

While this invention has been described fully and completely, it should be understood that, within the scope of the appended claims, the invention could be practiced otherwise than specifically described. Although the invention has been disclosed with reference to its preferred embodiments, from reading this description those of skill in the art can appreciate changes and modifications that may be made which do not depart from the scope and spirit of the invention as described above and claimed hereafter.

We claim:

1. A method to induce a negative dielectric constant in at least one material to achieve a negative dielectric constant state, comprising:
   introducing a dc bias across nano-particles within the at least one material, wherein the at least one material comprises 20 nm urea-coated $Ba_{0.8}Rb_{0.4}TiO(C_2O_4)_2$ nano-particles suspended in silicone oil.

* * * * *